United States Patent [19]

Nishikawa et al.

[11] 4,370,055
[45] Jan. 25, 1983

[54] DUPLICATING SYSTEM COMPRISING ELECTROPHOTOGRAPHIC COPYING APPARATUS AND OPTION DEVICE

[75] Inventors: Masaji Nishikawa; Kiyoshi Miyashita; Muneo Kasuga, all of Hachioji, Japan

[73] Assignee: Olympus Optical Company Limited, Tokyo, Japan

[21] Appl. No.: 261,741

[22] Filed: May 7, 1981

[30] Foreign Application Priority Data

May 9, 1980 [JP] Japan .................................. 55-61299

[51] Int. Cl.³ .............................................. G03B 27/70
[52] U.S. Cl. .................................. 355/14 SH; 355/1; 355/11; 355/55; 355/66
[58] Field of Search .................. 355/14 R, 11, 3 R, 51, 355/65, 66, 3 SH, 14 SH, 8, 1, 55-57

[56] References Cited

U.S. PATENT DOCUMENTS

| | | | |
|---|---|---|---|
| 3,592,539 | 7/1971 | Haslam et al. | 355/11 |
| 3,677,635 | 7/1972 | Auken et al. | 355/11 |
| 4,170,412 | 10/1979 | Grace et al. | 355/11 X |

FOREIGN PATENT DOCUMENTS

| | | |
|---|---|---|
| 42-4944 | 2/1967 | Japan . |
| 51-62724 | 5/1976 | Japan . |
| 52-127827 | of 1977 | Japan . |
| 52-55647 | 5/1977 | Japan . |

Primary Examiner—R. L. Moses

Attorney, Agent, or Firm—Fleit & Jacobson

[57] ABSTRACT

A duplicating system comprises an electrophotographic copier which includes a first optical scanning system for making a slit exposure, a first document feeder for feeding a first document to be copied at a first speed with respect to the first optical scanning system, a rotating photosensitive drum for forming an electrostatic latent image corresponding to the image of document, apparatus for forming a duplicated copy with the aid of the latent image and a sequence control circuit for controlling a duplicating operation in such a manner that the image of first document is projected onto the photosensitive drum from an imaginary control start position. An option device is detachably mounted on the copier and comprising a second optical scanning system for making a slit exposure, a second document feeder for feeding a second document to be copied at a second speed with respect to the second optical scanning system and an optional optical system for projecting the image of second document onto the photosensitive drum. The second document feeder and second optical scanning system in the option device have a geometrical configuration similar to that of the first document feeder and first optical scanning system in the copier so that the image of second document is projected on the photosensitive drum from the same position as the imaginary control start position, so that the duplicating operation for the second document with the option device is commonly controlled by the sequence control circuit provided in the copier.

14 Claims, 20 Drawing Figures

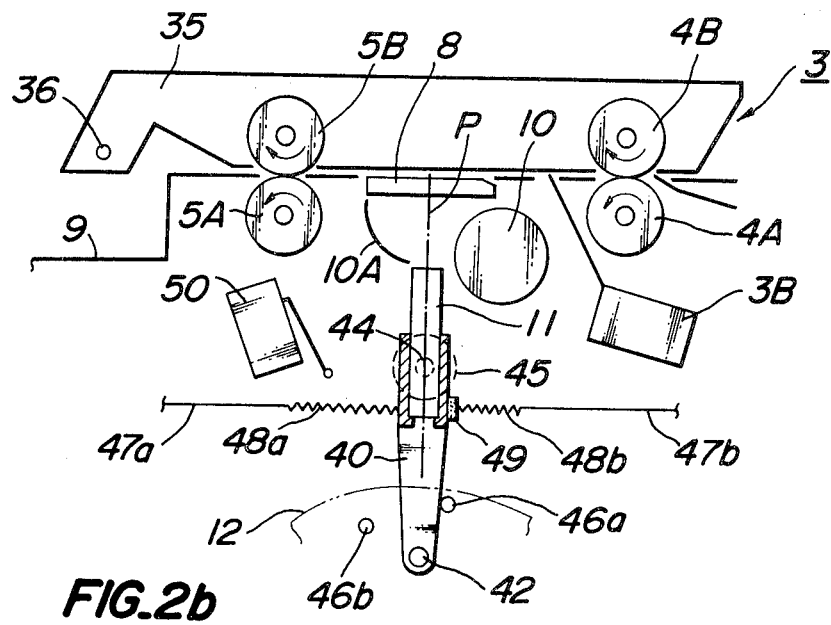
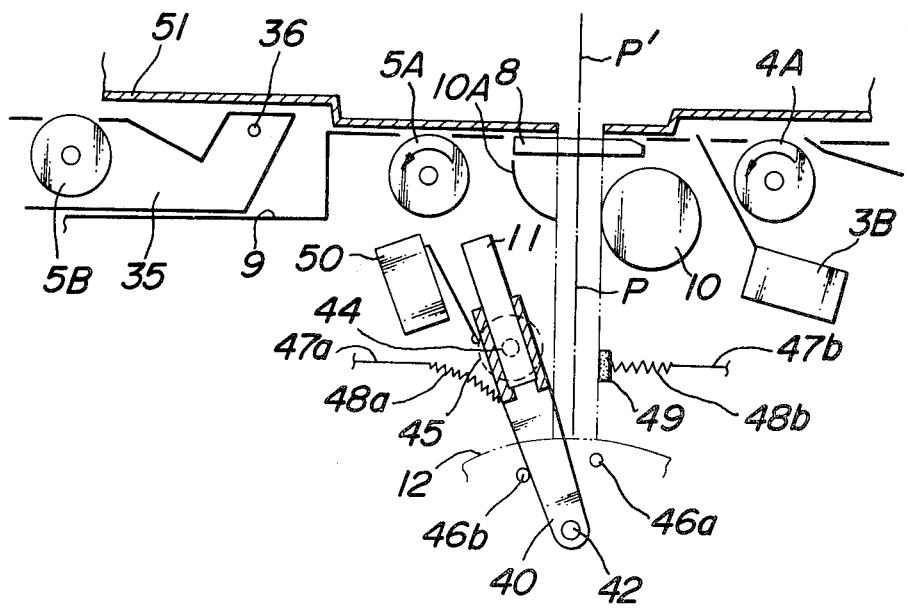

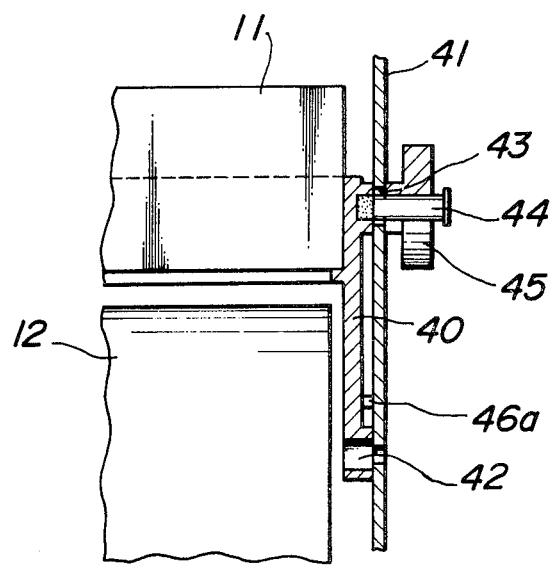

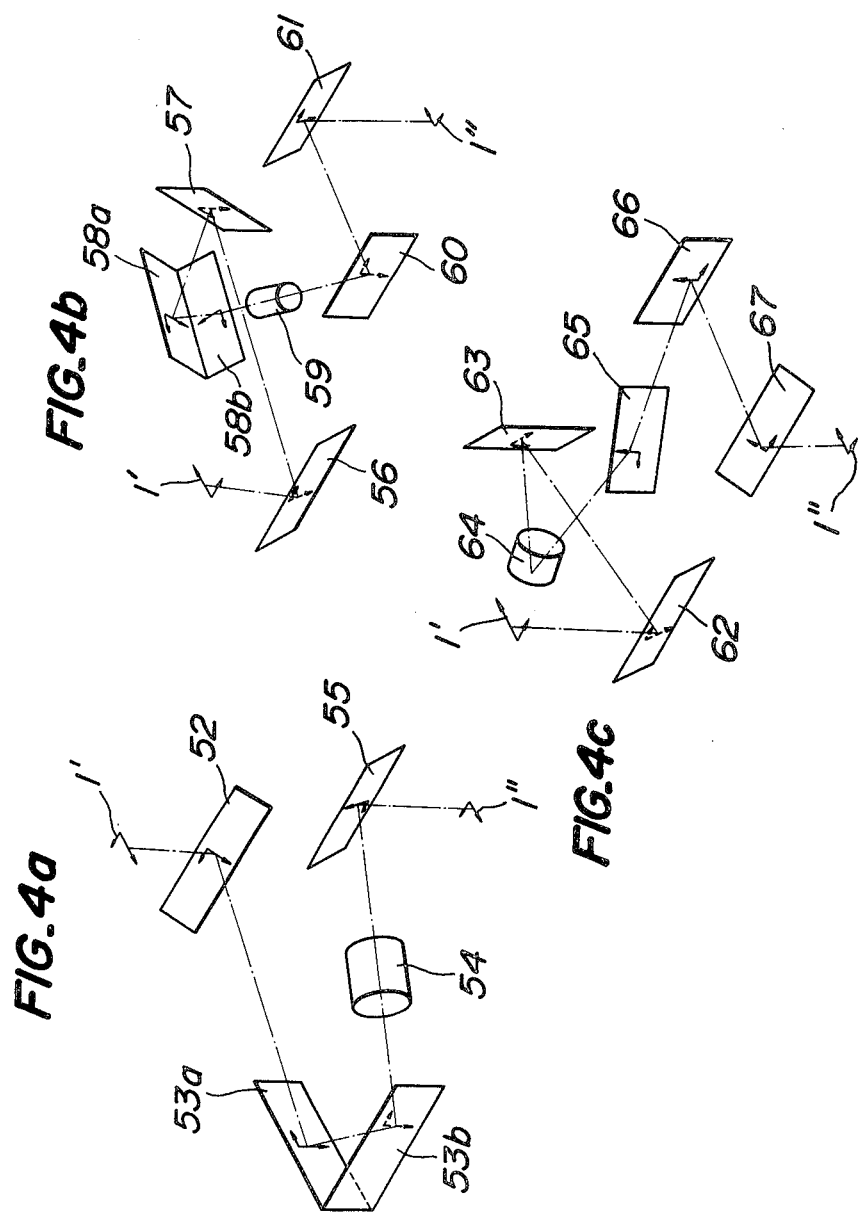

FIG._10

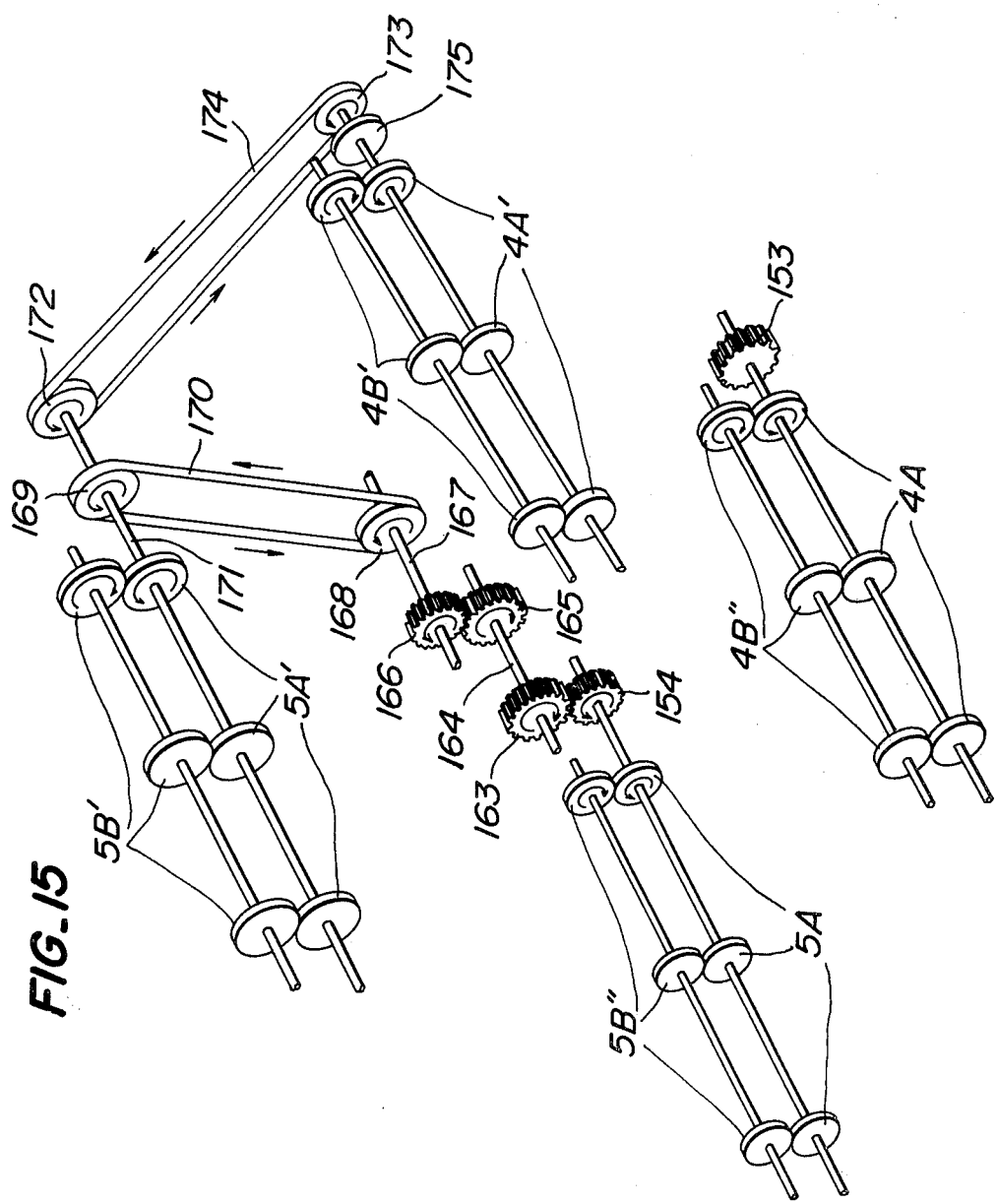

DUPLICATING SYSTEM COMPRISING ELECTROPHOTOGRAPHIC COPYING APPARATUS AND OPTION DEVICE

BACKGROUND OF THE INVENTION

The present invention relates to an electrophotographic duplicating system comprising an electrophotographic copier and an option device or accessory for forming an enlarged or reduced image of a document set in the option device.

The copying apparatus represented by an electrophotographic copier has been used in many ways for the purpose of copying documents, and almost all of the copiers are constructed to obtain a life-size copy of the same document being copied. On the other hand, there are known copiers that print a reduced image of a large size document or an enlarged image of a microfilm is printed in an electrophotographic manner, but such apparatus is assembled in a copier as an inseparable device or in case of using it as an option device, use is made of the same optical path as that of the copier itself or use is made of a part of an optical path in common with the copier itself. It is a technique to assemble a reduction optical system in the copier itself inseparably, but the thus assembled apparatus becomes large and complicated. It is further known to detachably add an optical image projector to the copier itself as an option or accessory device, but such apparatus also has various defects. For example, in Japanese Patent Application Publication No. 4,944/67, Japanese Patent Application Publication No. 8,437/69, Japanese Patent Laid-open No. 62,724/76, Japanese Utility Model Laid-opn No. 127,827/77, Japanese Patent Laid-open No. 55,647/77 and the like, there is disclosed that the whole frame of a microfilm image is projected on a document table or a photosensitive member as a still picture by an option device and the projected image is scanned and exposed in the former apparatus by a scanning optical system, while in the latter apparatus the projected image is directly converted into an electrostatic latent image. However, the copier for copying the whole frame of a microfilm image projected as a still picture is large as the apparatus itself and lacks universality and convenience as compared with the copier of the document moving, scanning and exposing type which has recently been widely used. In the former system for projecting the microfilm image on the document table, when an enlarged image is projected by an option device, it is necessary to provide a long optical path in the device, so that the option device becomes disadvantageously large. Moreover in such known electrophotographic duplicating system comprising the electrophotographic apparatus and the option device for projecting the enlarged or reduced image of document, it is impossible to control the option device commonly by means of a sequence control circuit for controlling a duplicating operation of the copier without the option device, because the image of the document is projected from the option device onto a photosensitive member of the copier from a position which is different from an imaginary control start position of the photosensitive member in case of normal duplicating operation without the option device. Therefore it is necessary to provide a separate sequence control circuit. This causes the duplicating system to have a complicated construction and also increases the cost.

SUMMARY OF THE INVENTION

The present invention has for its object to provide a novel and useful electrophotographic duplicating system comprising an electrophotographic copier of the slit exposure and scanning type and an accessory or option device for projecting an image of the document set in the option device, which system can eliminate the above described disadvantages of the known duplicating system.

It is another object of the invention to provide a duplicating system in which the option device can be commonly controlled by a sequence control circuit provided in the copying apparatus for controlling a normal duplicating operation without the option device.

According to the invention, an electrophotographic duplicating system comprises an electrophotographic copying apparatus which includes first optical scanning means for making a slit exposure, first means for feeding a first document to be copied at a first speed with respect to said first optical scanning means, photosensitive means for forming an elecrostatic latent image corresponding to the image of the document, means for forming a duplicated copy with the aid of said latent image, and sequence control means for controlling the various means in such a manner that said image of first document is projected onto the photosensitive means from an imaginary control start position, and an option device which includes means for detachably mounting the option device on the copying apparatus, second optical scanning means for making a slit exposure, second means for feeding a second document to be copied at a second speed with respect to said second optical scanning means and optional optical means for projecting the image of the second document onto said photosensitive means of the copying apparatus, whereby said second feeding means and second optical scanning means in the option device have a geometrical configuration similar to that of said first feeding means and first optical scanning means in the copying apparatus so that the image of second document is projected on the photosensitive means from the same position as said imaginary control start position and the duplicating operation for the second document with the option device is commonly controlled by said sequence control means provided in the copying apparatus.

BRIEF EXPLANATION OF THE DRAWINGS

FIGS. 2a and 2b are schematic views illustrating a mechanism for withdrawing an optical system of the copying apparatus in the present invention;

FIG. 3 is a cross section showing the moving mechanism of FIG. 2;

FIGS. 4a, 4b and 4c are perspective views showing three embodiments of an optional optical system installed in an option device according to the invention;

FIG. 15 is a perspective view illustrating the document feeder of the option device.

DESCRIPTION OF THE PREFERRED EMBODIMENTS

Figure 1:
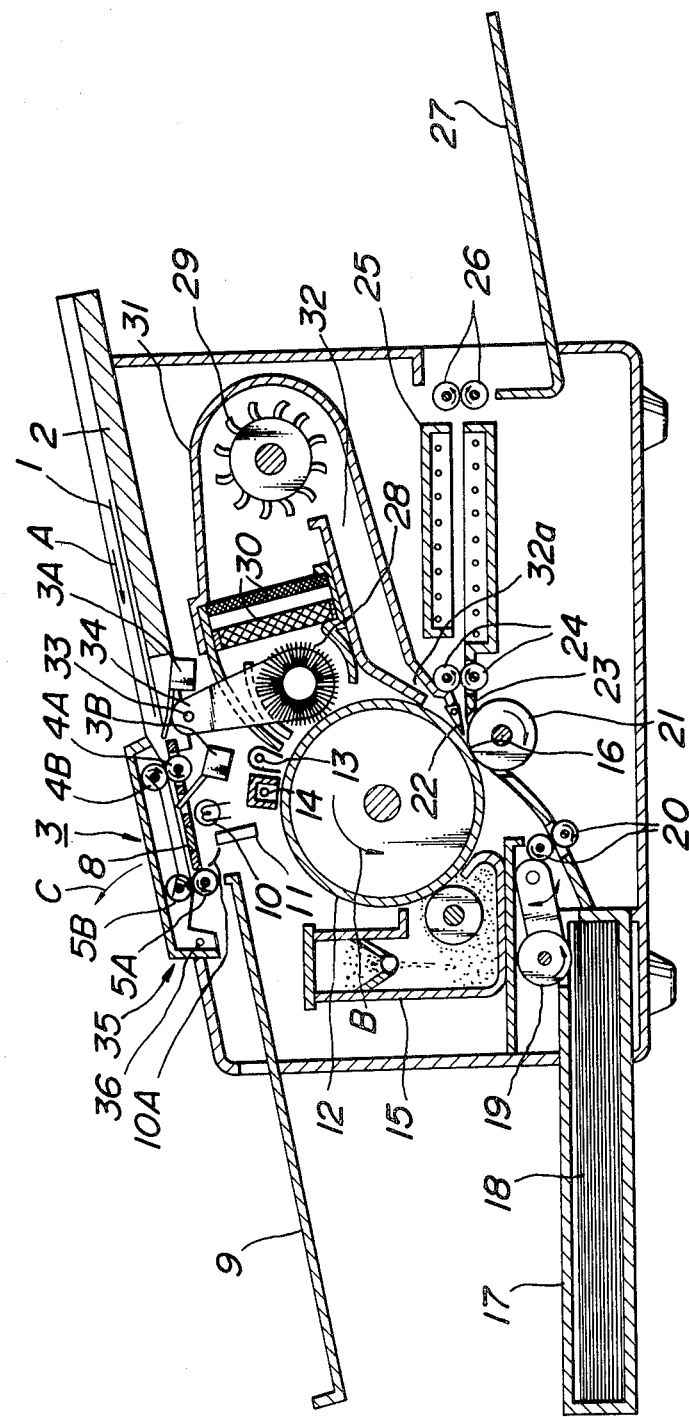
FIG. 1 is a cross section showing schematically an embodiment of a known electrophotographic copying apparatus of slit scanning type to which the present invention can be advantageously applied.

Referring now to the drawings, wherein the same reference numerals designate same or corresponding parts throughout the several views. FIG. 1 shows one embodiment of a conventional electrophotographic copying apparatus or copier, to which the present invention is preferably applied. The copying apparatus in this embodiment is of the type for that carries out scanning and exposure by fixing a scanning optical system and moving a document. In this copying apparatus, a sheet-like document 1 is placed on an inclined document table 2, inserted into a document feeder 3 from the direction of an arrow A; moved by document feed rollers 4A, 4B and 5A, 5B provided in the document feeder 3, and finally discharged on a document tray 9.

The document feed rollers 4A and 5A are selectively driven in response to signals generated by switches 3A and 3B which are arranged in a document feed path to detect the document 1. The upstream feed roller 4A is connected through a clutch (not shown) to a driving motor (not shown). The downstream feed roller 5A is directly connected to the driving motor and thus, is rotated as long as the motor rotates during a duplicating period. The clutch is driven in response to a signal which is produced when the switch 3A is actuated by the front edge of the manually inserted document 1. Then the roller 4A is rotated to feed the document 1 at a given speed V. As soon as the front edge of document 1 is detected by the switch 3B, the clutch is deenergized so as to stop the document feed for a relatively short time. At a suitable time, the clutch is actuated again to restart the feeding of the document 1. When the rear edge of document 1 has passed through the switch 3B, the switch is turned off and the clutch is deenergized so as to stop the rotation of the feed roller 4A. The rollers 4B and 5B rotate together with the rollers 4A and 5A, respectively.

During the feeding of document 1 through the feeder 3, the document 1 is illuminated by an illumination lamp 10 such as fluoroescent lamp and a reflector 10A, and a document image is projected on a rotating photosensitive drum 12 by an optical system 11 to make a slit exposure consisting of an array of converging optical fibers through a transparent glass plate 8. The photosensitive drum 12 comprises a conductive substrate and a photoconductive layer consisting of, for example, Se on the surface thereof. The drum 12 is rotated in the direction of an arrow B, erased by an erasing lamp 13, thereafter uniformly charged by a corona charger 14. The drum forms an electrostatic latent image on the photoconductive layer by receiving the optical image of the document. This electrostatic image is developed with toners by a dry developing device 15 using a developing agent of the two composition type and is carried to a toner image transfer section 16 according to rotation of the photosensitive drum 12. On the other hand, record papers 18 provided in a cassette 17 are taken out one by one by swinging and rotating pickup roller 19 and are sent to the toner image transfer section 16 by registering rollers 20 at a predetermined rate. In the toner image transfer section 16, the record paper is conveyed between a bias transfer roller 21 applied by a bias voltage and the photosensitive drum 12 so as to superimpose it on the toner image thereby to transfer a toner image onto the paper. In this case, the record paper 18 is closely carried to the toner image, i.e., the photosensitive drum 12, so that the paper is peeled off by a peeling claw 22 and an air flow which will be explained later on, conveyed along a guide plate 23, and fed into a fixing device 25 having a heater by means of carrying rollers 24, and then the toner image is fixed thereon. Finally the paper is discharged on a copy tray 27 by discharging rollers 26.

The toner image formed on the photosensitive drum 12 is not completely transferred to the record paper, but a part thereof remains on the drum 12, so that the remaining toner particles are brushed off by a rotating cleaner brush 28. The brushed-off toner particles are sucked by an air flow generated by rotation of a fan 29 and collected by filters 30. The cleaner brush 28, the filters 30 and the fan 29 are covered with a housing 31 to obtain an effective toner sucking force and to prevent the toner from being dispersed in the apparatus. Exhausted air from the fan 29 is guided to a duct 32. An exhaust port 32a of the duct 32 faces to the toner image transfer section 16 so as to act together with the claw 22 thereby effectively peeling the record paper from the photosensitive drum 12. The cleaner brush 28 is rotatably pivoted on an arm 34 rotatably mounted around a supporting shaft 33. When an electrostatic latent image once formed on the photosensitive drum 12 is repeatedly used, the toner developing and transferring steps are repeated, and, in case of multiple copying in which the toner images are successively transferred onto a plurality of record papers, the cleaner brush 28 is separated from the photosensitive drum 12. In addition, an upper carrying mechanism 35 of the document feeder 3 is so constructed that it can be opened and closed around a shaft 36 in the direction shown by an arrow C. When copying thick documents such as a book or the like, the carrying mechanism 35 is rotated in the direction of the arrow C and placed on the document tray 9 so as to form a thick document carrying path. The operation of the aforementioned parts which constitute the copying apparatus is controlled by detecting the document position by the switches 3A, 3B arranged in the document carrying path. The copying apparatus illustrated in FIG. 1 is of compact construction and duplicates ordinary sheet-like documents and books with a unit magnification.

The construction of adding a microfilm enlarged image projection device, a document reduced image projection device or the like as an option device to the copying apparatus of such document moving type with the scanning and exposing system has such advantages that the versatility of the copier is enlarged and a person who does want such function can simply choose not to use them. Thus, the copying apparatus is very high in usable value. However, one problem is to inexpensively make the device having such construction. If the apparatus becomes complicated in construction, its usable value is lost.

As apparent from the prior art, in the system of projecting an optical image formed by an option device through an optical path of the copying apparatus itself, in order to converge a luminous flux of the projected image to a projection lens of the apparatus itself, the optical system should be improved by providing a Fresnel lens or the like. Moreover, the type which uses the same optical path as that of the copying apparatus itself but keeps out a projection lens of the apparatus itself is known as a one shot exposure system. However, the one shot exposure system makes the copier large and does not lend itself to the miniature and handy copier which is the subject of the present invention. The present invention, therefore, provides a copying apparatus of a document scanning type which can receive an optical image from an option device by means of a simple construction.

FIG. 2a is a schematic view showing an embodiment of the copying machine of the document scanning and exposing type to be used in the duplicating system according to the invention. In FIG. 2a, an option device is not yet added to the copying apparatus. The copying apparatus shown in FIG. 2a is almost same as the copying apparatus illustrated in FIG. 1 except that a slit type exposing optical system 11 consisting of the array of converging optical fibers is not fixedly provided, but is swingable mounted. That is to say the optical system 11 is supported by a frame 40 which is journalled to a main body 41 about a shaft 42 as best shown in FIG. 3. In the main body 41 is formed an arcuate guide recess 43 extending in the swinging direction of the frame 40. A screw 44 is secured to the frame 40 through the recess 42. To the screw 44 is fastened an operating handle 45.

By turning the handle 45 after the screw 44 has been moved to a suitable position, the frame 40 and thus the slit exposing optical system 11 may be fixedly positioned with respect to the main body 41. In FIG. 2a, the frame 40 is positioned in such a manner that it makes contact with a stopper pin 46a secured to the main body 41. in this position, an optical image of a document which is fed by the document feeder 3 is projected onto the photosensitive drum 12 by means of the slit exposing optical system 11 situated in an optical path P. It should be noted that the photosensitive drum 12 is shielded against light except for the slit exposing optical system 11 by means of hard wares 47a, 47b of the main body and shielding bellows 48a, 48b. One end of the bellows 48a is connected to the hard ware 47a and the other end is coupled with a base portion of the frame 40. One end of the bellows 48b is connected to the hard ware 47b and the other end of a plate 49 which is made in contact with the frame 40 in the condition shown in FIG. 2a. The plate 49 extends in an axial direction of the drum 12 and is secured to the main body.

By loosening the handle 45, the optical system 11 can be manually turned in the counterclockwise direction in FIG. 2a into a position shown in FIG. 2b. In the present embodiment, this rotational movement of the optical system 11 in the counterclockwise direction can be limited by a stopper pin 46b secured to the main body 41. In this position, the optical system 11 is withdrawn out of the optical path P. This position of the system 11 is detected by a microswitch 50. After the handle 45 and, thus the slit exposing optical system 11, have been turned into the position shown in FIG. 2b, the frame 40 is secured to the main body 41 by tightening the handle 45.

In order to mount an option device 51 on the copying apparatus, the upper portion 35 of document feeder 3 is withdrawn to the left by rotating it about the shaft 36. Then the option device 51 is mounted on the copying apparatus in such a manner that an optical path P' of the option device 51 is made completely coincident with the optical path P of the copying apparatus. In this manner, an image projection start position on the photosensitive drum 12 can be made identical both for the copying operations with and without the option device 51. Therefore, a sequence control can be commonly used for both operations.

It should be noted that it is advantageous to provide click mechanisms for positioning the slit exposing optical system 11 at the two operational positions shown in FIGS. 2a and 2b, respectively.

In the present embodiment, the option device 51 can be detachably mounted on the copying apparatus. In this case, when the option device is used, a user can conveniently insert the document to be copied into the option device in the same direction as that into which the document is inserted into the copying apparatus. Otherwise, the user has to check the front and rear and right and left of the document and of a copy to be duplicated.

Further, the document guide marks on the option device should be reversed with respect to those on the table of the copying apparatus. Further when the duplication is effected, while the document is moved with respect to the fixed slit exposing optical system 11, the rotational direction of the photosensitive drum 12 should be made identical with the document feed direction; otherwise the image might be shifted on the drum surface. In order to make the document feed direction in the option device identical with that in the copying apparatus, there should be provided in the option device an optional optical system for forming an erecting real image of the document to be duplicated by means of the option device. This optional optical system may be provided in various forms.

FIGS. 4a, 4b and 4c are perspective views showing three embodiments of the optional optical system for forming an erecting real image of the document. In the embodiment illustrated in FIG. 4a, a document image 1' is reflected by a mirror 52 and then reflected by Dach mirrors 53a and 53b so as to reverse the image right and left. The image is further inverted up and down as well as right and left by means of a lens 54. Finally the image is reflected by a mirror to form a reduced document image 1".

In the embodiment illustrated in FIG. 4b the document image 1' is first reflected by mirrors 56 and 57 and is further reflected by Dach mirrors 58a and 58b toward a lens 59. An image formed by the lens 59 is reflected by a mirror 61 to form a reduced document image 1".

In the embodiment shown in FIG. 4c, the document image 1' is introduced through mirrors 62 and 63 to an in-mirror lens 64 and an image formed by the lens 64 is projected by means of mirrors 65, 66 and 67 as a reduced erecting real image 1".

By constructing the optional optical system in the option device as shown in FIGS. 4a to 4c, the reduced document image 1" is shifted with respect to the original document image 1' in a direction perpendicular to the feeding direction of document. Therefore, the document of the option device may be shifted with respect to the document table of the copying apparatus, so that a substantial area of the document table is free from the option device and the operator can easily handle the document on the table of the copying apparatus.

Figure 5:
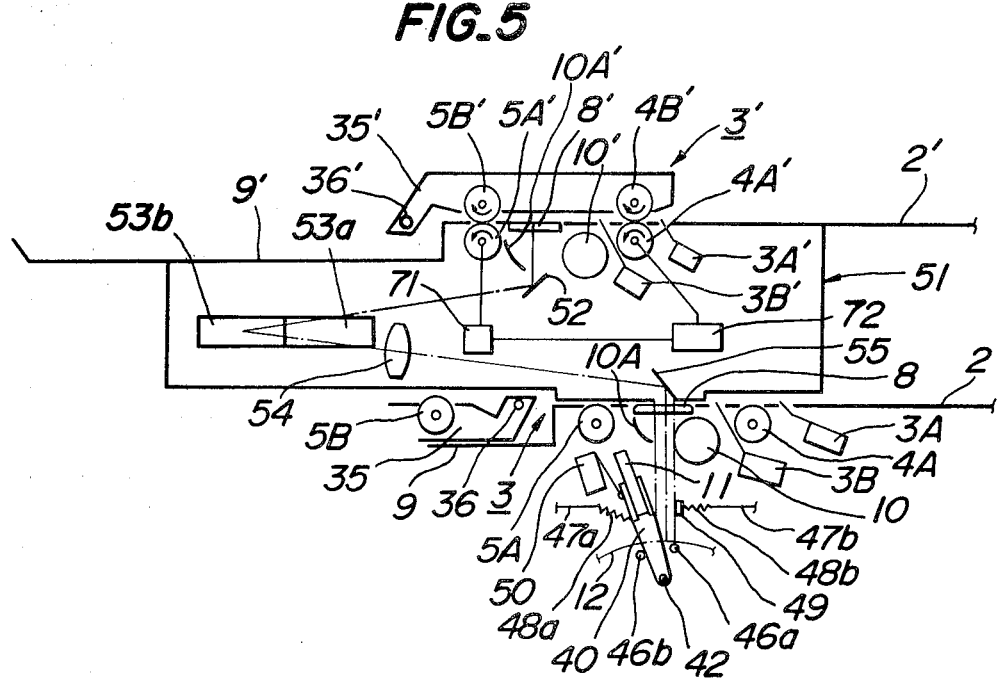
FIG. 5 is a schematic view illustrating an embodiment of the option device according to the invention.

FIG. 5 shows an embodiment of the option device 51 which is mounted on the copying apparatus shown in FIG. 2. The option device of the present embodiment comprises the optional optical system illustrated in FIG. 4a. A document feed mechanism of the option device 51 is substantially the same as that of the copying apparatus except for several points which will be explained later and thus, members similar to those of the copying apparatus are denoted by the same reference numerals with dash.

The document feed mechanism of the option device 51 comprises a driving motor 71 which is connected to an upstream feed roller 4A' by means of a clutch 72 and at the same time is directly connected to a downstream feed roller 5A'. In FIG. 5 these connections are shown only schematically. The motor 71 and clutch 72 are controlled by signals derived from document detecting switches 3A' and 3B' in the same manner as that of the document feed device 3 of the copying apparatus. As explained above, the option device 51 is so placed on the copying apparatus that their optical paths P and P' are made coincident with each other and thus, the reduced image of the document formed by the optional optical system in the option device 51 can be projected onto the photosensitive drum 12 from an imaginary sequence control start position thereof. Therefore, the sequence control of the copying apparatus can be used for printing a copy of the document inserted into the option device.

Figure 6:
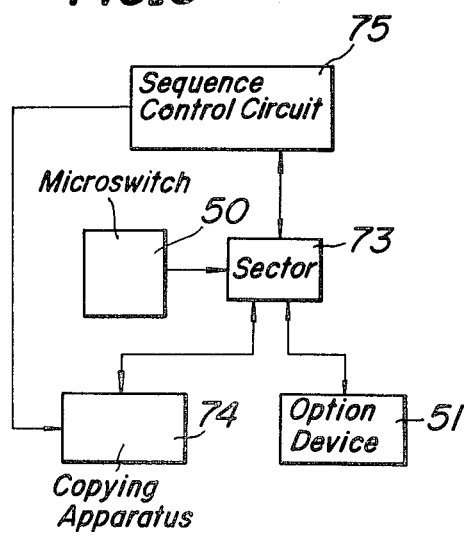
FIG. 6 is a block diagram showing an embodiment of a control circuit.

FIG. 6 is a block diagram showing an embodiment of a control circuit for controlling the operation of the copying apparatus and option device illustrated in FIG. 5. When the microswitch 50 is actuated, a sector 73 is driven into a state in which various control signals from a sequence control circuit 75 are selectively supplied to the option device 51. For instance, a signal for energizing the exposure lamp is supplied not to the lamp 10, but to the lamp 10' in the option device 51. On the contrary, when the microswitch 50 is made "off", the sector 73 is driven to supply the signals to the copying apparatus 74 and then the sequence control explained above with reference to FIG. 1 will be effected by a sequence control circuit 75 of the copying apparatus. Therefore, the document introduced into the option device 51 can be scanned in the same manner as in the copying apparatus 51. That is to say, when the slit exposing optical system 11 is turned left as shown in FIG. 2b by operating the handle 45, the microswitch 50 is turned "on" and the sector 73 is driven to supply the signals to the option device 51. Then the motor 71 is energized in response to a detection of a front edge of the document inserted into the option device 51 by the switch 3A' and the document is fed along the document feed path. During this feeding, the document is scanned by the optional optical system in the option device 51 and the reduced image of the document is projected onto the photosensitive drum 12 through the optical path P which has been formed by withdrawing the slit exposing optical system 11. In this case, since the optical path P' of the option device 51 is made completely coincident with the optical path P of the copying apparatus 74, the imaginary sequence control start position on the drum 12 from which the formation of the latent image corresponding to the reduced document image is effected, is made coincident with that in case of forming a latent image corresponding to an image of document inserted in the copying apparatus 74. Therefore it is not necessary to alter the sequence control of the duplicating operation for the copying apparatus 74.

In the embodiment explained above, the slit exposing optical system 11 is withdrawn from the optical path P by turning the system. It should be noted that the slit exposing optical system 11 may be pulled out of the copying apparatus in a direction perpendicular to a plane of the drawing of FIG. 2a and the microswitch 50 may be actuated in response to this pulling operation.

Figure 7A:
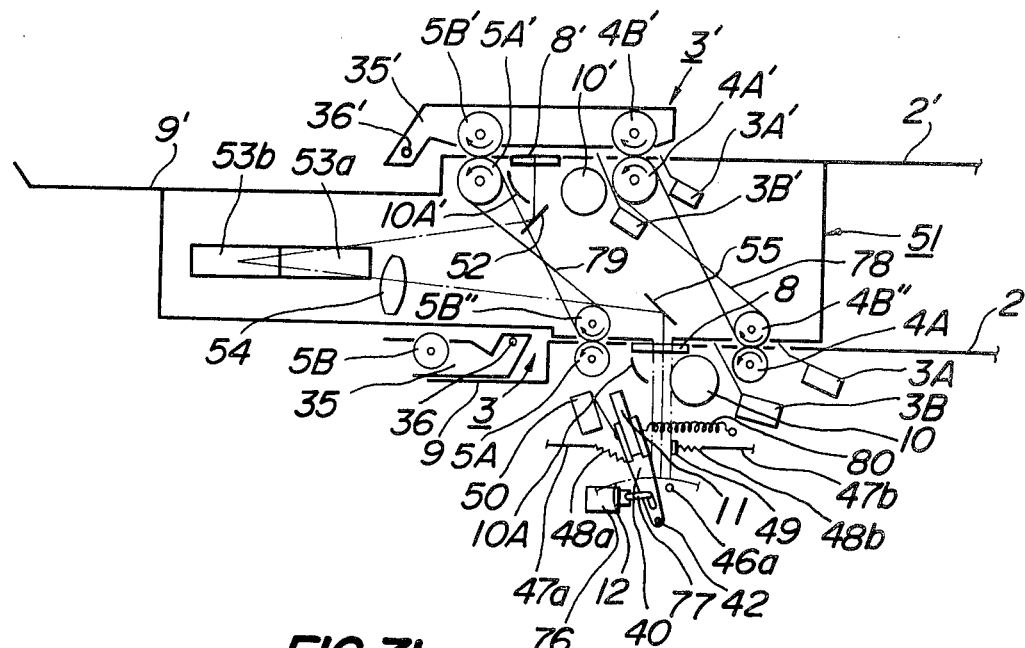
FIG. 7a is a schematic view illustrating another embodiment of the option device according to the invention and FIG. 7b is a block diagram showing a control circuit thereof.
Figure 7B:
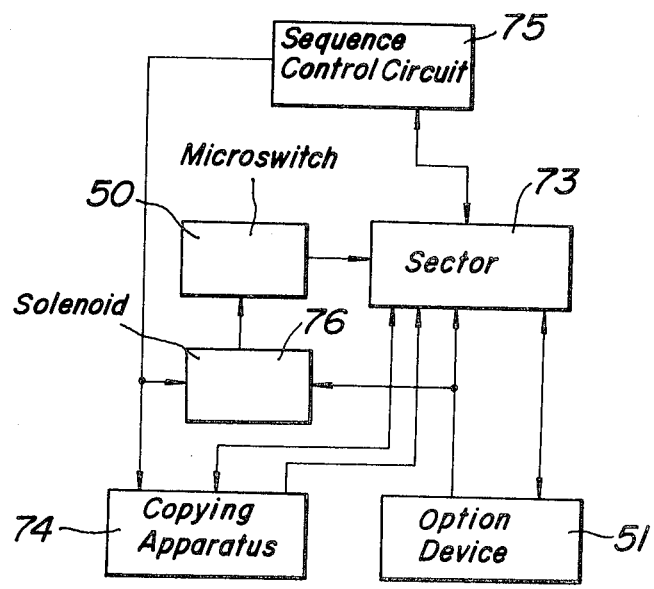

FIG. 7a and 7b show another embodiment of the option device according to the invention. In this embodiment the frame 40 for holding the slit exposing optical system 11 is connected to a plunger 77 of a solenoid 76. The solenoid is energized by a document detection signal from the switch 3A' of the option device 51 so as to withdraw the optical system 11 from the optical path P of the copying apparatus. Further in this embodiment, the document feeder 3' of the option device 51 is driven by means of the driving mechanism of the copying apparatus. To this end, the option device 51 comprises a pair of rollers 4B" and 5B" which are made in contact with the rollers 4A and 5A, respectively of the copying apparatus, and these rollers 4B" and 5B" are coupled with the rollers 4A' and 5A' by means of timings belt 78 and 79, respectively. These belts are so arranged that the feeding direction in the option device 51 is made identical with that in the copying apparatus. In the present embodiment, the slit exposing optical system 11 can be automatically moved relative to the optical path P of the copying apparatus, and the document feeder 3' of option device 51 can be driven by the motor and clutch provided in the copying apparatus. Therefore, it is not necessary to provide the motor 71 and clutch 72 shown in FIG. 5 in the option device. It should be noted that in the present embodiment the frame 40 holding the slit exposing optical system 11 is biased by a coiled spring 80 in the clockwise direction in FIG. 7a.

In the embodiment shown in FIGS. 7a and 7b, when the document is inserted into the option device 51, the switch 3A' is actuated by the front edge of document and the solenoid 76 is energized in response thereto. Then the optical system 11 is withdrawn out of the optical path P of the copying apparatus and the microswitch 50 is turned on. When the microswitch 50 is actuated, the sector 73 is driven to selectively supply the signals from the sequence control circuit 75 to the option device 51. In this manner the document feeder 3 of the copying apparatus is driven and at the same time the document feeder 3' of the option device 51 is driven by means of the timing belts 78 and 79 in synchronism with the document feeder 3. In this manner the document inserted into the option device 51 is scanned and a reduced image of the document is formed by the optional optical system in the option device 51 onto the photosensitive drum 12 from the imaginary projection-start position, from which position the image of the document inserted into the copying apparatus is also projected. When the document is inserted into the copying apparatus 74, while the option device 51 is mounted thereon, even if the switch 3A is actuated by the front edge of document, the solenoid 76 is not energized and thus, the microswitch 50 remains "off". Under such a condition, the sector 73 may conduct the signals to and from the copying apparatus 74 and the document inserted into the copying apparatus 74 can be duplicated even if the option device 51 is placed on the copying apparatus.

When the option device 51 projects the image of document reduced by a magnitude of n, the feeding speed $V_R$ of the feeder 3' of the option device 51 should be made equal to a feed speed V of the feeder 3 of the copying apparatus divided by n. That is to say the following equation should be satisfied; $V_R=(1/n)V$. This condition can be easily satisifed by suitably selecting the diameter of the rollers 4A' and 5A' and/or 4B'' and 5B''. In the embodiment shown in FIG. 7a, the diameter of these rollers 4A', 4B', 5A', 5B' is made larger than that of the rollers 4B'' and 5B''. Further as explained above in connection with FIG. 1, after the document is detected by the switch 3A', it is fed to the switch 3B' and is stopped thereat for a moment and then the document is further fed. This timing of restart of the document at the position of switch 3B' is made identical with that at the switch 3B in the copying apparatus, because the sequence control circuit 75 is used for both the copying apparatus and the option device. Distances A and $A_R$ from the switch 3A and 3A' to the optical paths P and P', respectively should satisfy a condition of $A_R=(1/n)A$ and distances B and $B_R$ from rotational axes of the rollers 4A and 4A' to the optical paths P and P', respectively should satisfy a condition of $B_R=(1/n)B$. By constructing in this manner, the reduction or enlargement duplicating operation with the option device 51 can be controlled by the sequence control circuit 75 of the copying appratus without altering any one of the various timing sequences. Further, the sequence can be initiated by either of the document detection signals from the option device 51 and the copying apparatus 74.

Figure 8A:
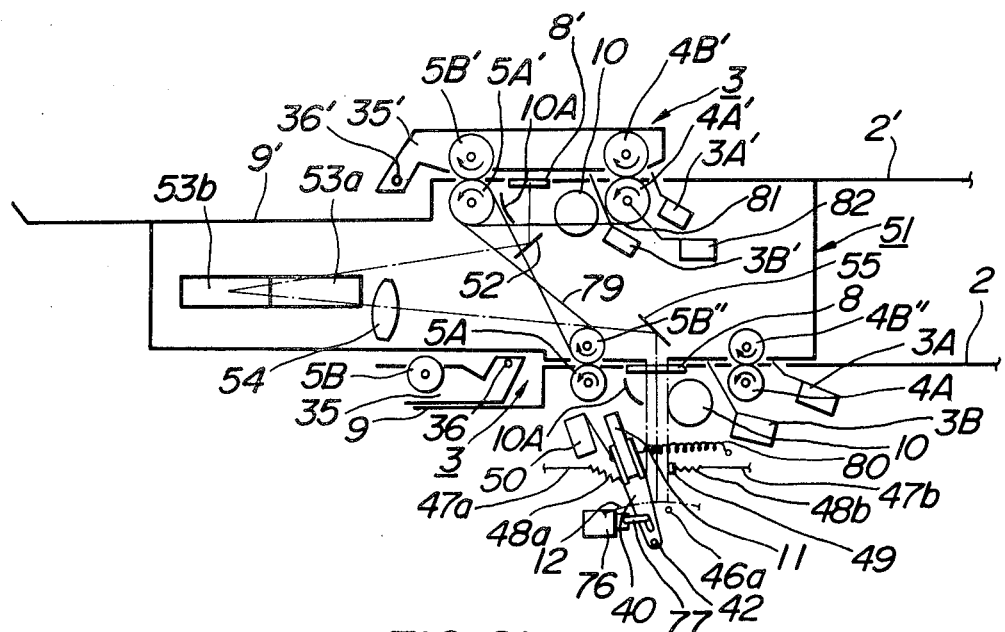
FIG. 8a is a schematic view showing another embodiment of the option device according to the invention and FIG. 8b is a block diagram illustrating a control circuit thereof.
Figure 8B:
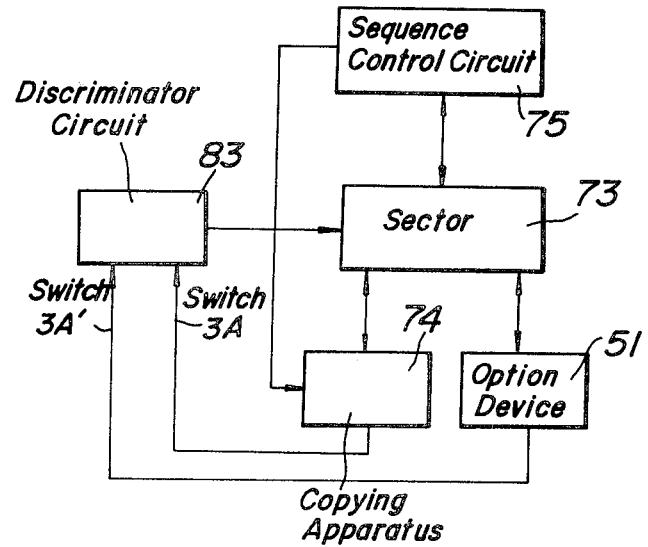

FIGS. 8a and 8b show another embodiment of the option device and its control circuit according to the invention. In this embodiment the downstream roller 5B'' is coupled with the downstream roller 5A' by means of the timing belt 79, and the roller 5A' is connected to the upstream roller 4A' by means of a timing belt 81 and a clutch (not shown). The clutch is controlled by a clutch solenoid 82. Since the downstream roller 5A is always rotated during the duplicating operation, the document feeder 3' of the option device 51 can be driven by the roller 5A. Also in the present embodiment, the duplicating operation with the option device 51 can be controlled by the sequence control circuit 75 of the copying apparatus without changing the timings of the various sequence control signals.

Now the operation of the device shown in FIG. 8a will be explained in more detail with reference to FIG. 8B. When the document is detected by the switch 3A' of the option device 51, it is recognized by a discriminating circuit 83 and the sector 73 is so controlled that the signals, such as a clutch solenoid signal which will be supplied to the clutch solenoid for the roller 4A of the copying apparatus in case of the normal duplicating operation, is supplied to the clutch solenoid 82 of the option device 51. Then the roller 4A' is rotated to feed the document. After that the duplication with the option device 51 can be controlled by the sequence control circuit 75 of the copying apparatus as explained above with reference to FIGS. 7a and 7b. The present embodiment has advantages in that either one of the duplicating operations with and without the option device can be carried out when in fact the document is inserted first into feeder 3 or 3'. For instance, when the documents are simultaneously inserted into the feeders 3 and 3', both operations are inhibited.

Figure 9:
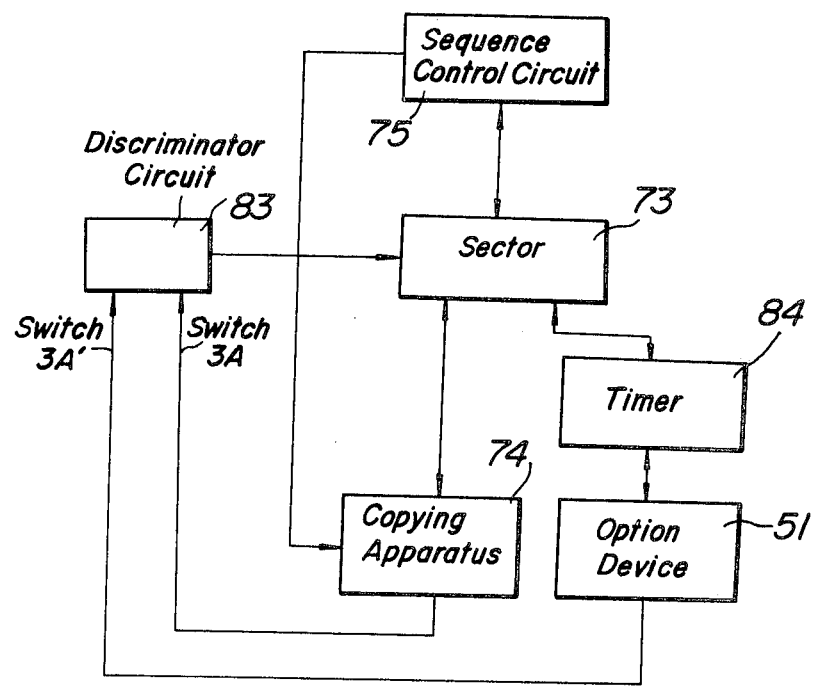
FIG. 9 is a block diagram depicting another embodiment of the control circuit.

FIG. 9 is a block diagram showing a still another embodiment of the control circuit according to the invention. In the previous embodiments, the document detection switches 3A, 3A' and the rollers 4A and 4A' of the copying apparatus 74 and option device 51 are so arranged that the distances A, $A_R$ and B, $B_R$ satisfy the relations $A_R=(1/n)A$ and $B_R=(1/n)B$. However, as the case may be, these elements could not be arranged in such a manner. In this embodiment, the rollers 4A' and 5B' and switches 3A' and 3B' in the document feeder 3' of the option device 51 are arranged in the same geometric configuration as that of the document feeder 3 of the copying apparatus 74. in order to project the reduced image of document inserted into the option device onto the drum 12 from the same imaginary sequence control position even in such a configuration, a timer circuit 84 arranged between the sector 73 and the option device 51 so as to delay the control signals by a predetermined time $\tau$.

Figure 10:
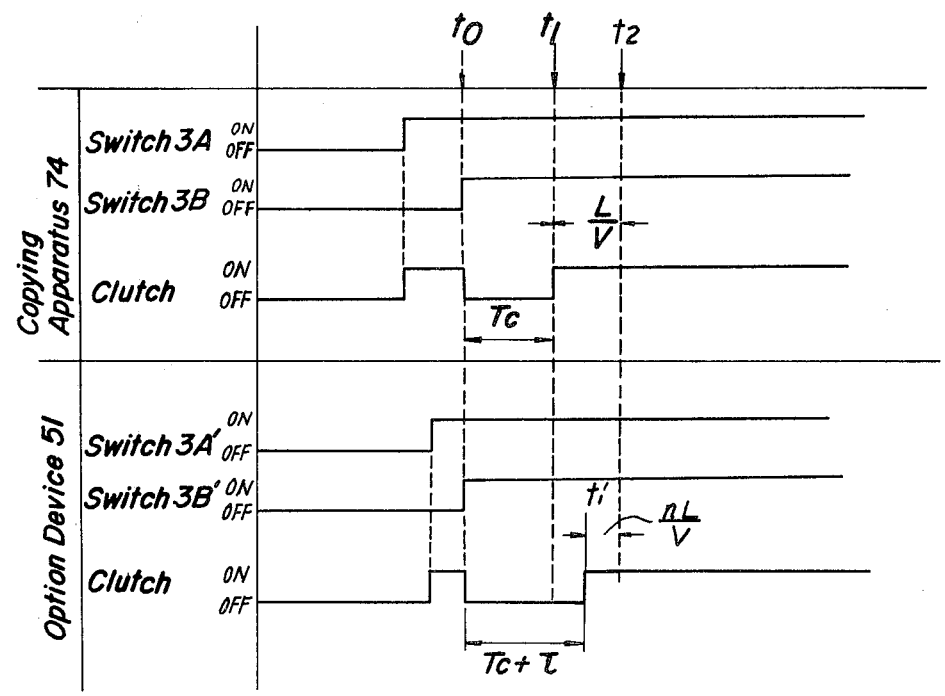
FIG. 10 shows waveforms for explaining the operation of the control circuit of FIG. 9.

As shown in the time chart of FIG. 10, the sequence control is initiated in response to the actuation of the downstream switch 3B or 3B'. That is to say, when the front edge of the document is detected by the switch 3B or 3B', the sequence control circuit 75 is initiated at a start time $t_0$. In the normal duplicating operation shown in an upper portion of FIG. 10, the circuit 75 produces a signal for actuating the clutch at a feed time $t_1$ after a time period $T_C$ from the start point $t_0$. Then the document is fed again to the scanning position along a distance L at the speed V and the front edge of document arrives at the scanning position at a time $t_2$ so as to start the projection. A time period from the timing $t_1$ to $t_2$ is equal to L/V. Contrary to this in case of the duplicating operation with the option device, the document feed start time $t_1$ is delayed to a time $t_1'$. A time period from this delayed timing $t_1'$ to the projection start timing $t_2$ is equal to nL/V. Therefore, the delay time $\tau$ should be equal to $(L/V)(1-n)$. Then the projection start time $t_2$ can be made identical for both duplicating operations with and without the option device.

Figure 11:
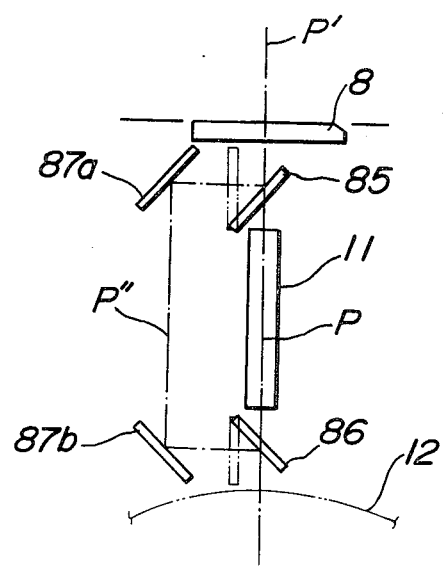
FIG. 11 is a schematic view showing another embodiment of the optical path changing mechanism.

FIG. 11 shows another embodiment of the device for withdrawing the slit exposing optical system 11 of the copying apparatus out of the optical path for projecting an image of the document inserted into the option device. In this embodiment, the slit exposing optical system 11 is not movable, but is arranged fixedly. At entrance and exit sides of the optical system 11 are arranged mirrors 85 and 86 which are swingable in conjunction with each other. The device further includes fixed mirrors 87a and 87b. When duplication without the option device, the mirrors 85 and 86 are withdrawn out of the optical path P passing through the optical system 11 as shown by imaginary lines. When the document image is to be projected by means of the option device onto the photosensitive drum 12, the mirrors 85 and 86 are driven into the optical path as illustrated by solid lines. Then the image is projected onto the drum via the optical path P' in the option device and an optical path P'' formed by the mirrors 85, 86, 87a and 87b in the copier. Also in this embodiment, the image of the document inserted into the option device can be projected on the drum at the same exposure position as that in the normal duplicating operation without the option device. It should be further noted that an optical system for projecting a reduced image may be inserted between the mirrors 87a and 87b.

Figure 12:
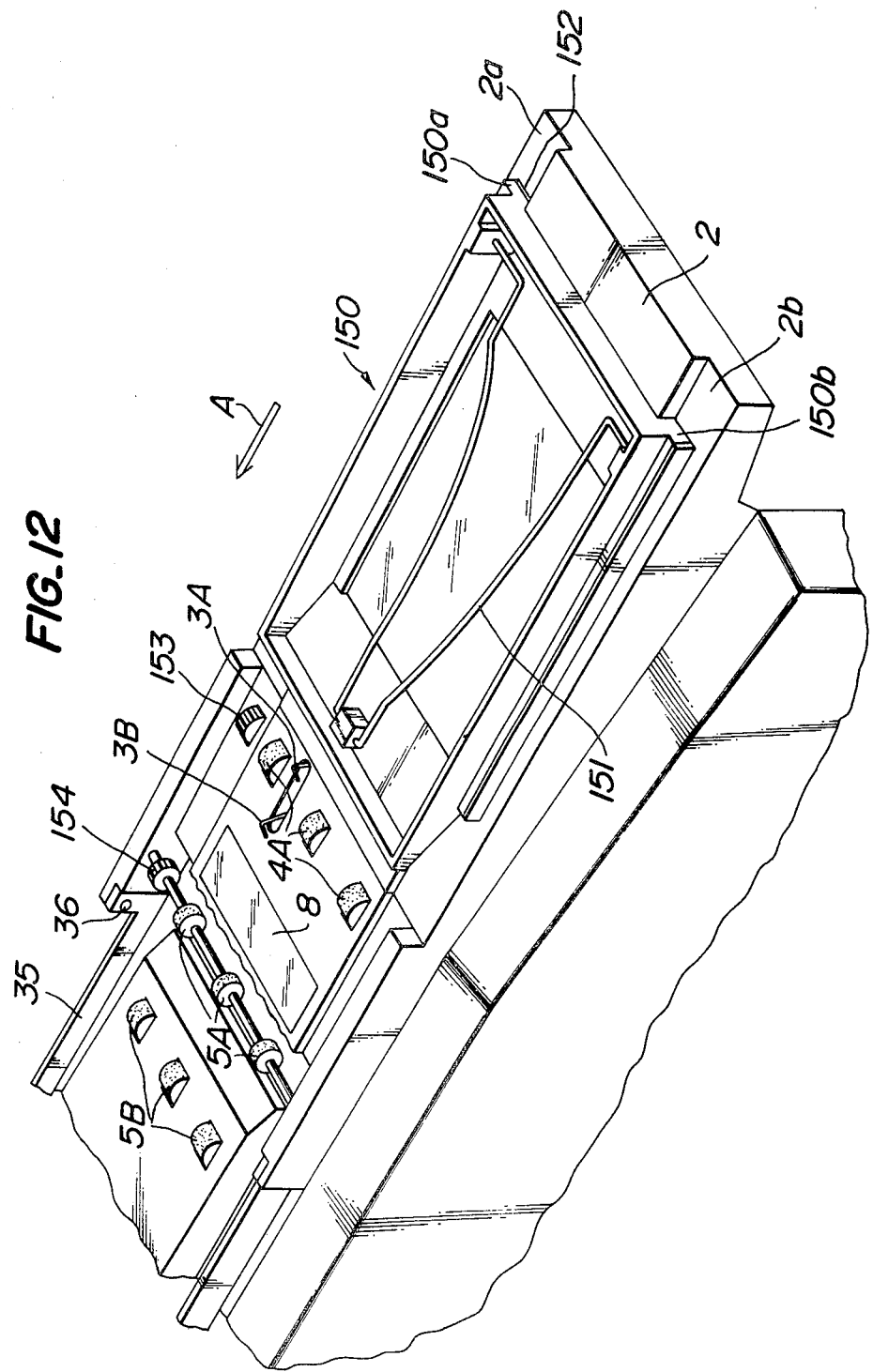
FIG. 12 is a perspective view showing another embodiment of the copying apparatus according to the invention.

FIG. 12 is a perspective view of the copying apparatus shown in FIG. 1 with the upper feed mechanism 35 being turned away from the lower feed mechanism. When a thick document such as a book is to be duplicated, the book is placed on a thick document carriage 150 made of transparent material. The carriage comprises a movable holder 151 for holding the book in position. Along side edges of the carriage are integrally formed flanges 150a and 150b. A rack 152 is secured to a lower surface of the flanges 150a. In the document table 2 are formed, along its side edges, recesses 2a and 2b for accommodating the flanges 150a and 150b, respectively. By sliding the carriage in the direction A, the rack 152 is engaged with gears 153 and 154 successively and thus, the carriage 150 is fed at a given velocity by means of the gears 153 and 154 and the rack 152.

Figure 13:
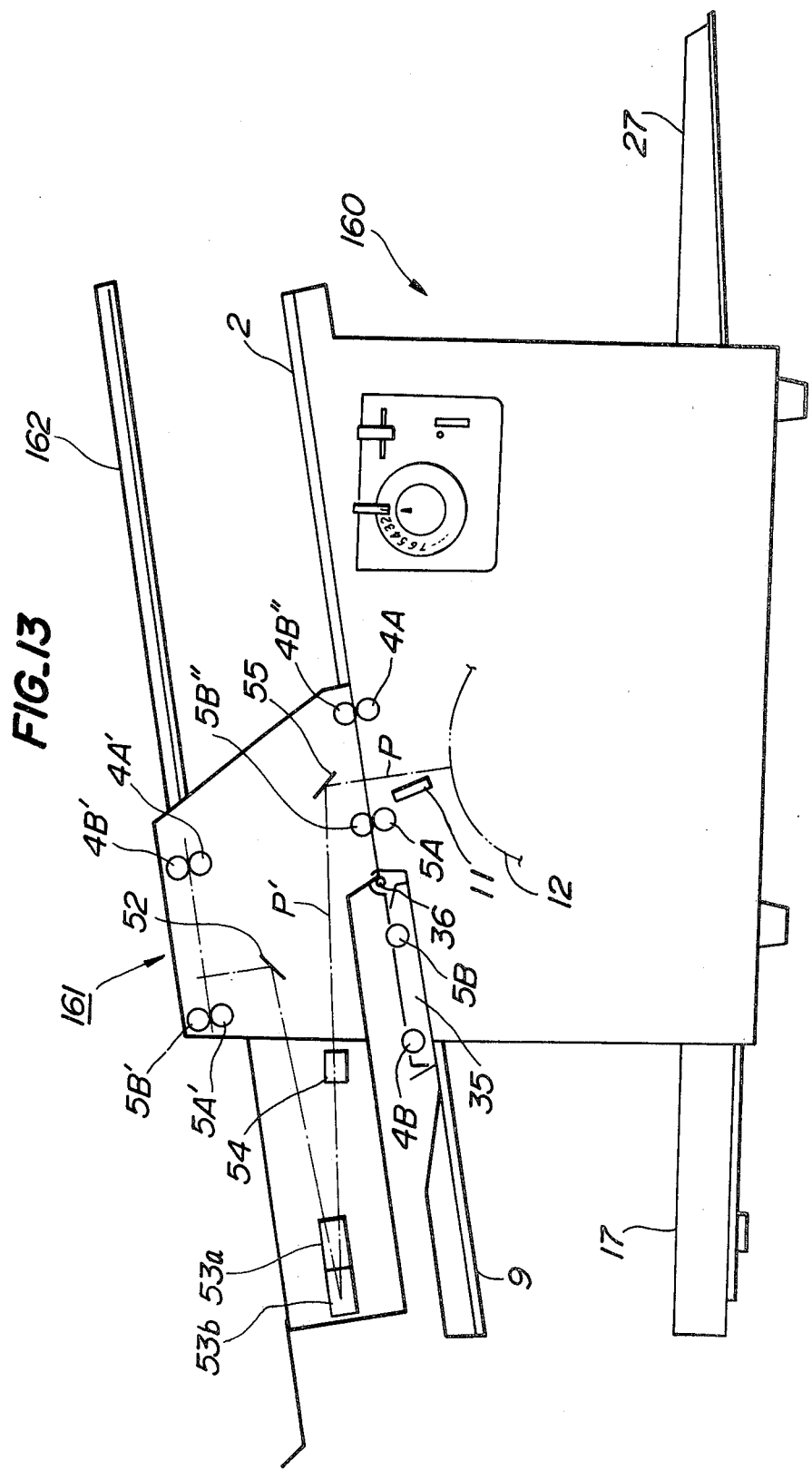
FIG. 13 is a front view illustrating a whole duplicating system according to the invention.

FIG. 13 is a front view illustrating the copying apparatus 160 shown in FIG. 12 and an option device 161 mounted on the copying machine 160. The option device 161 comprises a document table 162 and the optional optical system shown in FIG. 4a, including the mirrors 52, 53a, 53b and 55 and the projection lens system 54. The exit part of the optical path P' in the option device 161 is made coincident with the optical path P in the copying apparatus 160.

Figure 14:
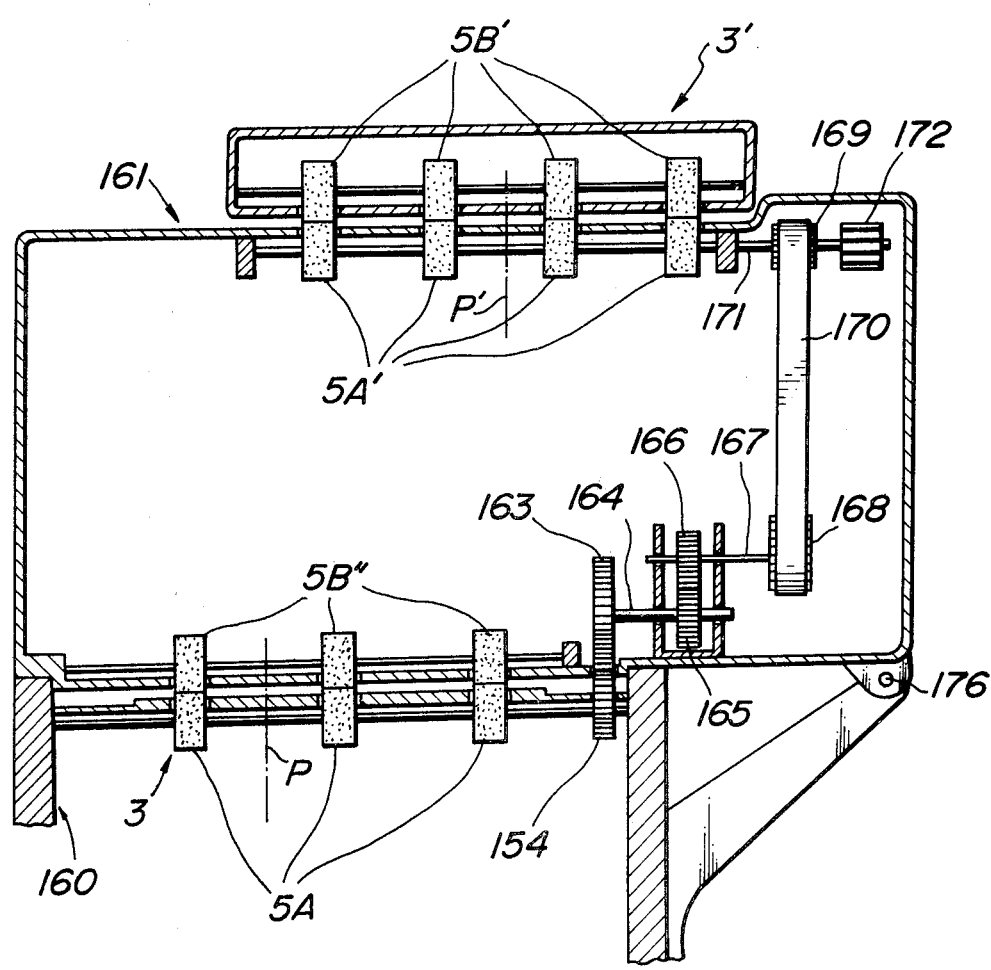
FIG. 14 is a cross section showing a document feeder of the option device.

In the present embodiment, the document feeder 3' of the option device 161 is driven by the document feeder 3 of the copying apparatus 160 by means of the gear 154 as shown in FIGS. 14 and 15. That is to say, the option device 161 comprises a gear 163 which engages with the gear 154 of the document feeder 3 of the copying apparatus 160. The gear 163 is connected to a shaft 164 to which is also secured a gear 165. The gear 165 is then engaged with a gear 166 connected to a shaft 167 to which a roller 168 is also fixed. The roller 168 is coupled with a roller 169 by means of a timing belt 170 and the roller 169 is secured to a shaft 171 to which the document feed rollers 5A' are fixed. To the shaft 171 is also connected a roller 172 which is coupled with a roller 173 by means of a timing belt 174. The roller 173 is connected to the feed rollers 4A' via a clutch 175. In this manner the feed rollers 5A' of the option device 161 are rotated in a given direction as long as the document feed rollers 5A of the copying apparatus 160 are rotated. The feed rollers 4A' of the option device 161 are rotated only when the clutch 175 is energized. By suitably choosing diameters of the gears 165 and 166 and rollers 168, 169, 172 and 173, the document feed speed in the option device 161 may be made equal to or different from the document feed speed in the copying apparatus 160. In the present embodiment since the option device 161 is used to project a reduced image of the document onto the photosensitive drum 12, the feed speed in the option device 161 is made higher than that in the copying apparatus 160. As clearly shown in FIG. 14, the option device 161 can be turned about a shaft 176 extending in the direction of the document feed and the copying apparatus 160 can be simply made free from the option device 161. Then the book carriage 150 can be used at will.

As shown in FIG. 14, when the optional optical system shown in FIG. 4a is used, the entrance part of the optical path P' in the option device 161 is shifted rightward with respect to the optical path P of the copying apparatus 160. Therefore, a substantial area of the document table 2 of the copying apparatus is not covered by the option device 161, so that the operator can easily and correctly place the document on the document table 2 of the copying machine. Further an automatic document feeder may be arranged on the document table 2 without being hindered by the option device 161. Usually the various operating members such as a copy set dial, a stop button and a copy density adjusting lever and various indication lamps are provided on a front panel of the copying apparatus. In this embodiment since the option device 161 is shifted backward, these operating members and indication lamps are not covered or hindred by the option device. Moreover the height of the option device can be made small and thus, the document table 162 is situated at a relatively lower level, so that the operator can easily handle the option device. Further the optional optical system installed in the option device 161 can be made simple.

The present invention is not limited to the embodiments explained above, but may be modified in various ways within the scope of the invention. For instance, in the above embodiment, the copying apparatus comprises the array of converging optical fibers. But it should be noted that any other type of optical system may be used. Further the selection between the copying apparatus and option device may be automatically effected by a switch which is actuated when the option device is mounted on the copying apparatus.

As explained above in detail, in the duplicating system according to the invention, the function of the copying apparatus can be materially increased by simply mounting the small option device. The duplicating operation with the option device can be equally controlled by the sequence control circuit provided in the copying apparatus. Moreover, the existing copying apparatus can be used in the duplicating system according to the invention with the minimum structural charge. Further, the function of the copying apparatus is not lost or deteriorated at all by the provision of the option device and thus, the copying apparatus can be used as is even if the option device is added thereto.

What is claimed is:

1. A duplicating system comprising an electrophotographic copying apparatus which includes first optical scanning means for making a slit exposure, first means for feeding a first document to be copied at a first speed with respect to said first optical scanning means, photosensitive means for forming an electrostatic latent image corresponding to the image of document, means for forming a duplicated copy with the aid of said latent image, and sequence control means for controlling said various means in such a manner that said image of first document is projected onto the photosensitive means for an imaginary control start position, and an option device which includes means for detachably mounting the option device on the copying apparatus, second optical scanning means for making a slit exposure, second means for feeding a second document to be copied at a second speed with respect to said second optical scanning means and an optional optical means for projecting the image of second document onto said photosensitive means of the copying apparatus, wherein said second feeding means and second optical scanning means have a geometrical configuration similar to that of said first feeding means and first optical scanning means so that the image of the second document is projected on the photosensitive means from the same position as said imaginary control start position and the duplicating operation for the second document with the option device is commonly controlled by said sequence control means provided in the copying apparatus.

2. A system according to claim 1, wherein said optional optical means includes means for projecting the image of the second document onto the photosensitive member through the same optical path as that through which the image of first document is projected onto the photosensitive means.

3. A system according to claim 2, wherein said first scanning optical system in the copying apparatus comprises an array of converging optical fibers and means for withdrawing the array of converging optical fibers out of said optical path in the copying apparatus, when the image of second document is projected onto the photosensitive means.

4. A system according to claim 3, wherein said means for withdrawing the array is automatically actuated in response to an insertion of the second document into the option device.

5. A system according to claim 1, wherein the copying apparatus comprises first means for detecting an insertion of the first document into the copying apparatus, the option device comprises second means for detecting an insertion of the second document into the option device, and the system further comprises means for selecting either one of the copying apparatus and the option device in response to actuation of either one of the first and second detecting means, respectively, and for controlling the selected one of the copying apparatus and the option device by means of said sequence control means.

6. A system according to claim 1, wherein said optional optical means includes means for projecting the image of the second document with a projection magnitude of n, and said first and second feeding means are so constructed that the first speed is made n times of the second speed, while the first and second documents are fed in the same direction.

7. A system according to claim 6, wherein the copying apparatus comprises first means for detecting an insertion of the first document, the option device comprises second means for detecting an insertion of the second document, and a time period necessary for the second document travelling from said second detecting means to said second optical scanning means is made n times of a time period necessary for the first document travelling from said first detecting means to said first optical scanning means.

8. A system according to claim 7, further comprising means for delaying signals supplied from the sequence control means to one of the copying apparatus and the option device by a delay time depending upon a value of said n.

9. A system according to claim 1, wherein said second feeding means in the option device comprises a driving motor and a plurality of feed rollers driven by said motor to feed the second document in a direction which is same as that in which the first document is fed in said copying apparatus.

10. A system according to claim 1, wherein said second feeding means in the option device comprises a plurality of feed rollers for feeding the second document and means for transferring a driving force of the first feeding means in the copying apparatus to said feed rollers to feed the second document in a direction which is the same as that in which said first document is fed in said copying apparatus.

11. A system according to claim 10, wherein said driving force transferring means comprises at least one coupling roller which is made in contact with at least one feed roller provided in the first feeding means for feeding the first document in the copying apparatus and coupling means for transferring a rotational movement of the coupling roller to said feeding rollers of the second feeding means.

12. A system according to claim 10, wherein said driving force transferring means in the option device comprises a first gear which is engaged with a second gear provides in said first feeding means for feeding a thick document carriage in the copying apparatus, and coupling means for transferring a rotational movement of the coupling gear to said feed rollers of the second feeding means.

13. A system according to claim 10, wherein said first feeding means of the copying apparatus comprises a lower feeding mechanism having feeding rollers and a driving source for rotating the feeding rollers, and an upper feeding mechanism having rollers which are rotated with being in contact with said feeding rollers of the lower feeding mechanism, and said option device is mounted on the copying apparatus after the upper feeding mechanism has been removed from the lower feeding mechanism.

14. A system according to claim 1, wherein said optional optical means provided in the option device comprises at least two reflection mirrors and a projection lens system for forming an erecting real image of the second document and having entrance and exit optical axes which are shifted in a direction perpendicular to a feeding direction of the first and second documents.

* * * * *